United States Patent
Li et al.

(10) Patent No.: US 10,211,767 B2
(45) Date of Patent: Feb. 19, 2019

(54) BACK EMF MONITOR FOR MOTOR CONTROL

(71) Applicant: TEXAS INSTRUMENTS INCORPORATED, Dallas, TX (US)

(72) Inventors: Qunying Li, Allen, TX (US); Juergen Luebbe, Fairview, TX (US); Robert E. Whyte, Jr., Dallas, TX (US)

(73) Assignee: Texas Instruments Incorporated, Dallas, TX (US)

( * ) Notice: Subject to any disclaimer, the term of this patent is extended or adjusted under 35 U.S.C. 154(b) by 0 days.

(21) Appl. No.: 15/396,989

(22) Filed: Jan. 3, 2017

(65) Prior Publication Data

US 2017/0117835 A1  Apr. 27, 2017

Related U.S. Application Data

(60) Continuation of application No. 14/821,282, filed on Aug. 7, 2015, now Pat. No. 9,575,473, which is a division of application No. 14/048,672, filed on Oct. 8, 2013, now Pat. No. 9,136,787.

(60) Provisional application No. 61/718,364, filed on Oct. 25, 2012.

(51) Int. Cl.
    *H02P 6/18*      (2016.01)
    *H02P 7/06*      (2006.01)
    *G05B 11/32*   (2006.01)
    *H02P 7/29*      (2016.01)

(52) U.S. Cl.
    CPC ............... *H02P 7/06* (2013.01); *G05B 11/32* (2013.01); *H02P 7/29* (2013.01)

(58) Field of Classification Search
CPC ... G05B 11/32; H02P 7/29; H02P 6/08; H02P 6/16; H02P 1/00; H02P 3/00; H02P 5/00; H02P 6/00; H02P 7/00; H02P 1/46; H02P 3/18; H02P 6/14; H02P 27/04; H02P 27/06; H02P 41/00; H02P 6/18; H02P 6/182; G11B 5/5534; G11B 21/12; G11B 5/5547; G11B 21/083; G11B 33/144; G11B 5/5526; G11B 5/5586; G11B 5/59627; G11B 21/22; B60L 3/0038; F23N 2033/04; F23N 3/082; F25B 2600/21
USPC ..... 318/135, 560, 459, 650, 400.01, 400.02, 318/400.14, 400.15, 400.32, 400.34, 432, 318/434, 700, 701, 727, 779, 799, 800, 318/801; 388/800, 909, 910, 928.1, 815
See application file for complete search history.

(56) References Cited

U.S. PATENT DOCUMENTS 3,859,579 A     1/1975   Plunkett
3,911,693 A * 10/1975   Seigler ................. F24F 1/02
                                           62/151
3,913,342 A * 10/1975   Barry ................... F04B 49/10
                                           318/473

(Continued)

*Primary Examiner* — Antony M Paul
(74) *Attorney, Agent, or Firm* — Michelle F. Murray; Charles A. Brill; Frank D. Cimino

(57) ABSTRACT

An integrated circuit includes a motor current input voltage-to-current (VI) converter that receives a motor current sensor voltage from a motor and a reference voltage to generate an output current related to a motor's current. A motor current calibration VI converter compensates for errors in the motor current input VI converter and generates a calibration output current based on the reference voltage, wherein the output current and the calibration output current are combined to form an estimate of the motor's current.

20 Claims, 7 Drawing Sheets

(56) References Cited

U.S. PATENT DOCUMENTS

| | | | | |
|---|---|---|---|---|
| 3,982,405 A * | 9/1976 | Seigler | F24F 1/02 | 327/456 |
| 4,227,139 A | 10/1980 | Rosink et al. | | |
| 4,240,020 A * | 12/1980 | Okuyama | H02P 25/03 | 318/721 |
| 4,466,749 A | 8/1984 | Cunningham et al. | | |
| 4,608,527 A | 8/1986 | Glennon et al. | | |
| 4,642,537 A * | 2/1987 | Young | H02P 6/182 | 318/400.31 |
| 5,047,700 A | 9/1991 | Szakaly | | |
| 5,373,223 A * | 12/1994 | Akagi | H02M 5/4585 | 318/438 |
| 5,510,687 A * | 4/1996 | Ursworth | H02H 7/0833 | 318/471 |
| 5,781,363 A * | 7/1998 | Rowan | G11B 5/5534 | 360/75 |
| 5,982,130 A * | 11/1999 | Male | H02P 25/034 | 318/400.31 |
| 6,204,629 B1 * | 3/2001 | Rote | G11B 5/5526 | 318/803 |
| 6,463,211 B1 * | 10/2002 | Peritore | G11B 5/5526 | 318/400.34 |
| 6,690,536 B1 * | 2/2004 | Ryan | G11B 5/5534 | 360/78.04 |
| 6,697,207 B2 | 2/2004 | Harmer | | |
| 6,704,261 B2 | 3/2004 | Watt et al. | | |
| 6,754,151 B2 | 6/2004 | Watt | | |
| 6,909,575 B2 * | 6/2005 | Soyama | G11B 33/1406 | 360/75 |
| 7,249,489 B2 | 7/2007 | Allmendinger | | |
| 7,280,308 B2 | 10/2007 | Kokami | | |
| 7,477,471 B1 * | 1/2009 | Nemshick | G11B 5/59627 | 360/75 |
| 7,554,403 B1 * | 6/2009 | Sakurai | H03F 1/223 | 330/254 |
| 7,561,366 B2 * | 7/2009 | Wasa | G11B 21/12 | 360/75 |
| 7,573,670 B1 * | 8/2009 | Ryan | G11B 21/12 | 360/75 |
| 7,787,211 B2 * | 8/2010 | Kim | G11B 5/596 | 360/78.06 |
| 7,800,857 B1 * | 9/2010 | Calaway | G11B 5/5534 | 360/75 |
| 7,876,522 B1 * | 1/2011 | Calaway | G11B 21/12 | 360/75 |
| 8,188,696 B2 * | 5/2012 | Shimizu | H02P 6/14 | 318/400.29 |
| 8,294,400 B2 * | 10/2012 | Harmer | G11B 21/22 | 318/400.34 |
| 8,693,132 B1 * | 4/2014 | Koay | G11B 21/22 | 360/75 |
| 8,988,811 B1 * | 3/2015 | Ding | G11B 5/5547 | 360/55 |
| 2003/0214266 A1 * | 11/2003 | Cheng | H02P 6/06 | 318/716 |
| 2003/0222714 A1 * | 12/2003 | McGinn | G05F 1/561 | 330/252 |
| 2004/0090195 A1 * | 5/2004 | Motsenbocker | B63B 43/18 | 318/109 |
| 2004/0164783 A1 * | 8/2004 | Baru | H03F 3/45183 | 327/309 |
| 2005/0168862 A1 * | 8/2005 | Jeong | G11B 5/5534 | 360/75 |
| 2005/0218853 A1 * | 10/2005 | Kokami | G05B 11/28 | 318/599 |
| 2006/0087363 A1 * | 4/2006 | Galbiati | G11B 5/022 | 327/494 |
| 2007/0001632 A1 * | 1/2007 | Daio | G11B 5/5526 | 318/400.04 |
| 2007/0013333 A1 | 1/2007 | Ajima et al. | | |
| 2008/0100243 A1 | 5/2008 | Kurosawa et al. | | |
| 2009/0201086 A1 * | 8/2009 | Kindt | H03F 1/34 | 330/257 |
| 2010/0182715 A1 * | 7/2010 | Harmer | G11B 21/12 | 360/75 |
| 2013/0158808 A1 | 6/2013 | Imamura et al. | | |

* cited by examiner ial application Ser. No. 14/821,282, filed Aug. 7, 2015, which is a divisional of U.S. patent application Ser. No. 14/048,672, filed Oct. 8, 2013, (now U.S. Pat. No. 9,136,787), which claims the benefit of U.S. Provisional Application No. 61/718,364, filed Oct. 25, 2012, all of which are incorporated herein by reference in their entirety.

BACK EMF MONITOR FOR MOTOR CONTROL

CROSS-REFERENCE TO RELATED APPLICATION(S)

This application is a continuation of U.S. patent application Ser. No. 14/821,282, filed Aug. 7, 2015, which is a divisional of U.S. patent application Ser. No. 14/048,672, filed Oct. 8, 2013, (now U.S. Pat. No. 9,136,787), which claims the benefit of U.S. Provisional Application No. 61/718,364, filed Oct. 25, 2012, all of which are incorporated herein by reference in their entirety.

TECHNICAL FIELD

This disclosure relates to drive control circuits, and more particularly to integrated circuits to monitor back electromotive force (BEMF) of a motor.

BACKGROUND

In order to control a motor, such as hard disk drive motor, a voltage known as back electromotive force (BEMF) can be computed for the respective motor. Such computation is performed by a monitor circuit in the analog domain where a first analog stage estimates the motor's resistance and a second analog stage estimates the motor's voltage. The motor voltage and resistance computation can then be combined in the second analog stage to form the BEMF voltage computation which is provided to a motor controller to facilitate control of the motor. Presently, each analog stage employs multiple front end resistors to perform voltage-to-current conversions from motor sensing elements in order to determine the motor resistance and voltage. The front end resistors require precise matching to enable accurate measurements and this can lead to various issues.

SUMMARY

This disclosure relates to back electromotive force (BEMF) monitor circuits. In one example, an integrated circuit includes a motor current input voltage-to-current (VI) converter that receives a motor current sensor voltage from a motor and a reference voltage to generate an output current related to a motor's current. A motor current calibration VI converter compensates for errors in the motor current input VI converter and generates a calibration output current based on the reference voltage, wherein the output current and the calibration output current are combined to form an estimate of the motor's current.

In another example, an integrated circuit includes a motor voltage input voltage-to-current (VI) converter that receives a motor voltage sensor voltage from a motor and a reference voltage to generate an output current related to the motor's voltage. A motor voltage calibration VI converter compensates for errors in the motor voltage input VI converter and generates a calibration output current based on the reference voltage, wherein the output current and the calibration output current are combined to form an estimate of the motor's voltage.

In yet another example, an integrated circuit includes a motor current input voltage-to-current (VI) converter that receives a motor current sensor voltage from a motor and a reference voltage to generate an output current related to a motor's current. A motor current calibration VI converter compensates for errors in the motor current input VI converter and generates a calibration output current based on the reference voltage, wherein the output current and the calibration output current are combined to form an estimate of the motor's current. A motor voltage input voltage-to current (VI) converter receives a motor voltage sensor voltage from the motor and a reference voltage to generate an output current related to the motor's voltage. A motor voltage calibration VI converter compensates for errors in the motor voltage input VI converter and generates a calibration output current based on the reference voltage. The estimate of the motor's current and the estimate of the motor's voltage are combined to form an estimate of the motor's back electromotive force (BEMF) voltage.

DETAILED DESCRIPTION

A monitor circuit is provided for determining back electromotive force (BEMF) voltages for motor control, such as a hard disk drive controller. The monitor circuit can be provided as an integrated circuit that employs voltage-to-current (VI) converters at its front end to a motor current and voltage to enable an analog computation of the motor's BEMF voltage. The VI converters in the monitor circuit perform voltage-to-current conversions from sensors via high impedance inputs that obviate the need to have matched resistor networks to perform the conversions. The VI converters can be accurately calibrated while utilizing a smaller amount of integrated circuit area than matched resistor network circuits. The VI converters can also be configured to provide improved common mode rejection over resistive network implementations.

In resistance front-end BEMF monitor circuits, for example, to achieve the required common mode rejection ratio (CMRR) specification, analog stage front end resistors have to be accurately matched. In an integrated circuit, the resistor matching level $$\sigma \propto \frac{1}{\sqrt{WL}},$$

where W and L are the width and length of the resistors. This implies that enhancing matching level (i.e., CMRR) by a factor of two requires four times larger area consumption. To further improve the resistor matching level, a resistor trimming circuit may be employed. Both resistor matching and trim circuit requirements are very area-demanding for an integrated circuit, which is undesirable in a high-volume product line, for example a HDD (Hard Disk Drive) Servo IC product. Resistor matching accuracy and trimming accuracy are also constrained by circuit temperature coefficient and voltage coefficient effects. Thus, resistor matching requirements place considerable strains on suitable integrated circuit implementations for a high-performance BEMF monitor. The circuits described herein obviate the requirement for the front-end accurately-matched resistors as well can also provide enhanced BEMF computations.

Figure 1:
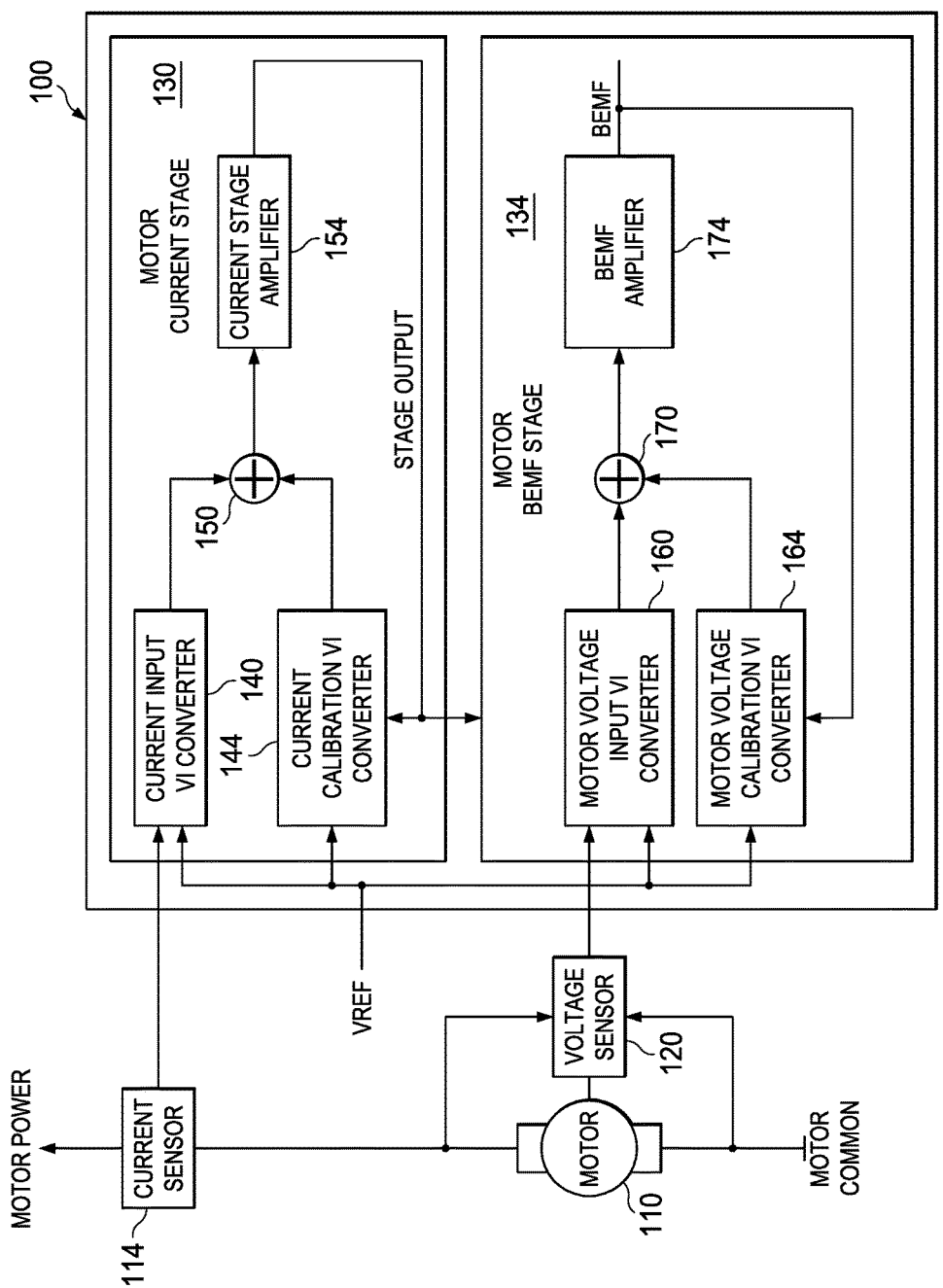
FIG. 1 illustrates an example of an integrated circuit back electromotive force (BEMF) monitor.

FIG. 1 illustrates an example of an integrated circuit 100 for a back electromotive force (BEMF) monitor. A motor 110 is energized via motor power and common connections which can be supplied from a controller (not shown). When the motor 110 is in motion, it generates BEMF voltage on the coil inside the motor and the BEMF voltage is usually proportional to the motor speed. The target is to compute the BEMF voltage through the voltage measured cross the motor 110 and the current flowing through the motor. Current from the motor 110 is sensed via a current sensor 114 and voltage from the motor is sensed via voltage sensor 120. The current sensor 114 and/or voltage sensor 120 can be implemented by resistive networks, for example. The current sensor 114 generates a voltage proportional to the motor current where a motor current stage 130 determines a value for the motor's current. Output from the motor current stage 130 is fed to a motor BEMF stage 134 that determines motor voltage via the voltage sensor 120. Additionally, the motor BEMF stage 134 combines the current estimate from the motor current stage 130 with the motor voltage determination to compute a motor BEMF voltage shown as BEMF that can be subsequently sent to a controller to control the motor 110.

A motor current input voltage-to-current (VI) converter 140 in the motor current stage 130 receives a voltage from the current sensor 114 and a reference voltage VREF to generate an output current related to the current through the motor. The reference voltage VREF can be a periodically switched value that is employed across the circuit 100 to enable determination of BEMF, such as can vary depending on an operating mode of the circuit 100. A current calibration VI converter 144 can be configured to compensate for errors (e.g., gain errors, CMRR) in the motor current input VI converter 140 and generate a calibration output current based on the reference voltage VREF and the feedback from the output of current stage amplifier 154. The output current and the calibration output current of converters 140 and 144 are combined at a summing node 150 such as corresponding to a difference between the input current and the calibration current. The summing node 150 can in turn provide a corrected indication of motor current. As disclosed herein, the motor current and corresponding motor voltage can be utilized to provide an estimate of the motor's resistance, which is employed to determine the BEMF of the motor 110. Output from the summing node 150 is fed to a current stage amplifier 154 which generates an output that is fed back to the motor current calibration VI converter 144 and is also provided to the motor BEMF stage 134 for determination of motor BEMF.

A motor voltage input VI converter 160 in the motor BEMF stage 134 receives a motor sensor voltage from the voltage sensor 120 and the reference voltage VREF to generate an output current related to the motor's voltage. A motor voltage calibration VI converter 164 compensates for errors (e.g., gain errors, CMRR) in the motor voltage input VI converter 160 and generates a calibration output current based on the reference voltage VREF and the feedback from the output of BEMF amplifier 174. The output current and the calibration output current from VI converters 160 and 164 are combined at summing node 170 (e.g., based on a difference between the respective signals) to form an estimate of the motor's BEMF voltage. Output from the summing node 170 is fed to BEMF amplifier 174 which generates a BEMF voltage output that can be employed by a controller to control the motor 110.

In order to determine BEMF, output from the motor current stage 130 can be combined with the voltage determinations in the motor BEMF stage 134. The output from the current stage amplifier 154 can be processed according to alternative configurations in the motor BEMF stage 134 to determine the BEMF (See FIGS. 2 and 3 below). In one example configuration, the current stage output is processed in the motor BEMF stage 134 via an additional VI converter whose output is summed along with currents representing motor voltage and calibration at 170 (See FIGS. 2 and 4). In another example configuration, the current stage output is utilized by the motor voltage calibration VI converter 164 as feedback which can be combined with the BEMF feedback from the BEMF amplifier 174 (See FIGS. 3 and 5).

As a further example, VI converters 140 and 144 can be differential amplifiers. For instance, a differential amplifier for the motor current VI converter 140 can have one input of the differential amplifier receive voltages from the current sensor 114 and another input to receive the reference voltage VREF. Similarly, the motor current calibration VI converter 144 can have one input of the differential amplifier receive the reference voltage VREF and another input to receive sense stage output as feedback from the current stage amplifier 154. Outputs from both differential amplifiers can be coupled to form the summing node 150 as will be illustrated and described with respect to FIGS. 6 and 7 below. The motor current stage 130 can thus be configured as a four input operational amplifier having two pairs of differential inputs and a single output. Similarly, the motor BEMF stage 134 can be configured as a four input amplifier or a six input amplifier depending on the configuration of the stage as will be illustrated and described below.

By utilizing the VI converters 140, 144, 160, and 164 in lieu of conventional front end resistive networks, performance of the circuit 100 can be improved in terms of smaller integrated circuit area and improved common mode rejection characteristics. In one example, the motor 110 can be a Voice Coil Motor (VCM) where the circuit 100 can be employed as part of a hard disk drive (HDD) servo integrated circuit, for example. The BEMF monitor operation can include two steps, that is, gain calibration mode (to calibrate the gain of motor current stage 130) and BEMF monitor mode (to compute motor BEMF voltage). In the first step, in the gain calibration mode, a given amount of current $I_1$ is forced into the motor path while the motor 110 is kept still so that its BEMF voltage is zero. The motor voltage sensed at sensor 120 is $I_1 * R_M + L_M * (dI_1/dt)$, where $R_M$ and $L_M$ are respectively resistance and inductance of the motor 110. Since the voltage is usually sensed after motor current settles down, i.e., $dI_1/dt=0$ so item $L_M * (dI_1/dt)$ is negligible in the context. Meanwhile, the motor current sensed at current sensor 114 $I_1 * R_{SNS}$, where $R_{SNS}$ is the sense resistance, is amplified by the gain G of stage 130. The stage 130 output $I_1*R_{SNS}*G$ is fed to motor BEMF stage 134 to be subtracted from the motor voltage $I_1*R_M$. In other words, motor BEMF stage 134 performs a calculation $I_1*R_M - I_1*R_{SNS}*G$. The goal is to digitally adjust the gain G of current stage 130 so that stage 134 output $I_1*R_M - I_1*R_{SNS}*G$ is about equal to zero. Thus, gain of current stage 130 $G=R_M/R_{SNS}$ is digitally calibrated and memorized.

In step 2, in the BEMF monitor mode, an arbitrary current i is dumped into motor path by controller (not shown) and motor is driven to a certain speed and it generates corresponding BEMF voltage. The motor voltage sensed at voltage sensor 120 is $V_{BEMF}+L_M*(di/dt)+i*R_M$, while the motor current sensed at 114 is gained up G times in the motor current stage 130. The on-time computation performed in BEMF stage 134 is (motor voltage sensed in sensor 120)−(motor current sensed in sensor 114)*G= $(V_{BEMF}+L_M*(di/dt)+i*R_M)-(i*R_{SNS})*G=V_{BEMF}$, where $G=R_M/R_{SNS}$ is digitally calibrated and memorized in the first step. That is, the output of stage 134 is an estimation of BEMF voltage of motor 110, assuming the sense and computation operations are performed after i settles down and (di/dt)=0.

In one example, the circuit 100 can be provided as a circuit (e.g., integrated circuit, discrete circuit, combination of integrated circuit and discrete circuits) for monitoring motor BEMF. This can include different analog and/or digital circuit implementations. For instance, in some cases, field effect transistors (e.g., N-type or P-type) can be employed and in other cases junction transistors or diodes employed.

Figure 2:
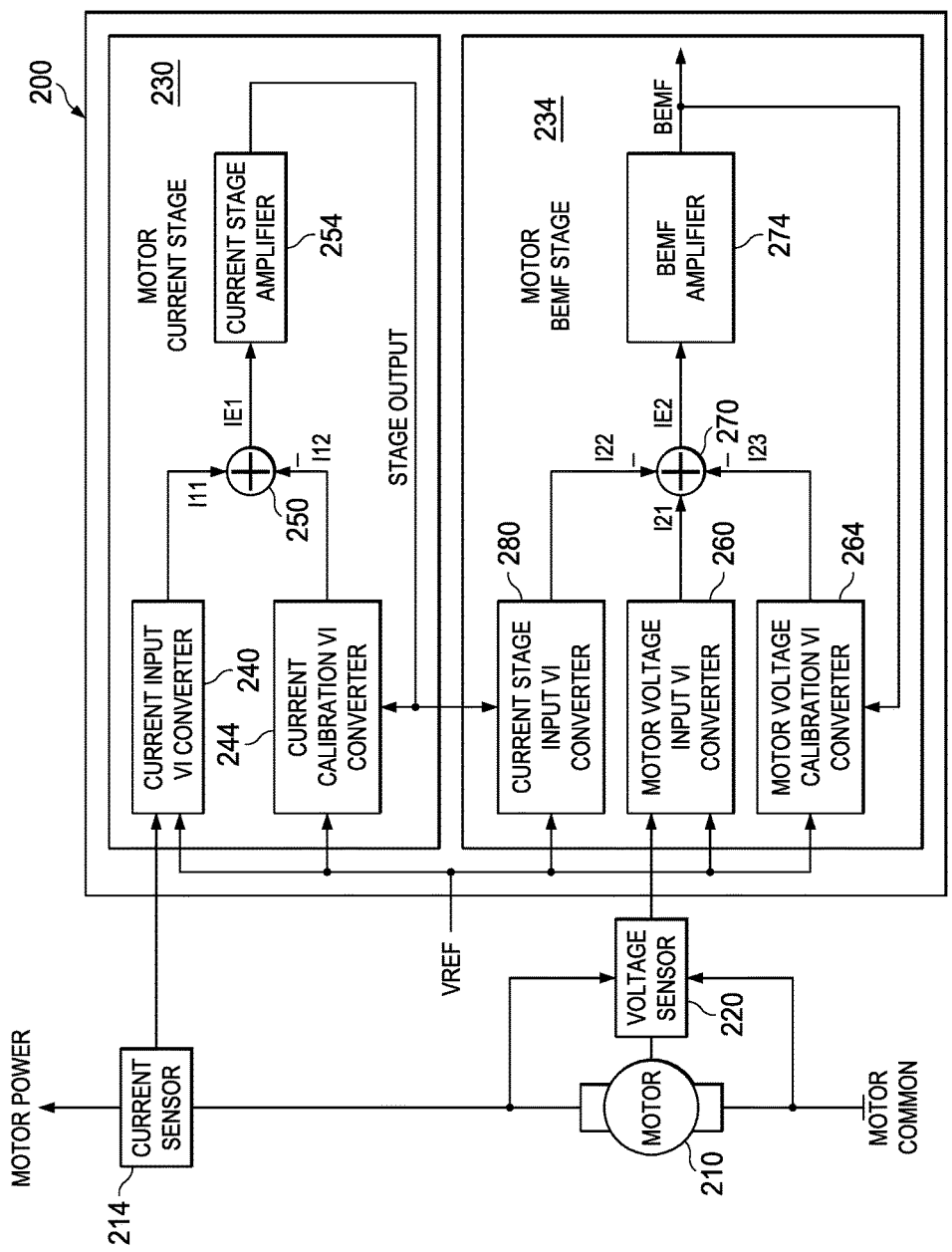
FIG. 2 illustrates an example of an integrated circuit that includes back electromotive force (BEMF) monitor further implementing an additional VI converter in a motor BEMF stage to compute motor BEMF.

FIG. 2 illustrates an example of an integrated circuit 200 for a back electromotive force (BEMF) monitor that employs an additional VI converter in a motor BEMF stage to compute motor BEMF. A motor 210 is energized via motor power and common connections which can be supplied from a controller (not shown). Current from the motor 210 is sensed via current sensor 214 and voltage from the motor is sensed via voltage sensor 220, where a motor current stage 230 determines the motor's current. Output from the motor current stage 230 is fed to a motor BEMF stage 234 that determines motor voltage via the voltage sensor 220. Additionally, the motor BEMF stage 234 combines the current estimate from the motor current stage 230 with the motor voltage determination to compute a motor BEMF voltage shown as BEMF that can be sent to a controller to control the motor 210.

A first voltage-to-current converter, current input VI converter 240, in the sense stage 230 receives a motor current sensor voltage from the current sensor 214 and a reference voltage VREF to generate an output current $I_{11}$ related to the motor's current. A second VI coveter, motor current calibration VI converter 244, compensates for errors (e.g., gain errors, CMRR) in the motor current input VI converter 240 and generates a calibration output current $I_{12}$ based on the reference voltage VREF and the feedback from output of current stage amplifier 254. The output current $I_{11}$ and the calibration output current $I_{12}$ of converters 240 and 244 are combined at a summing node 250. Output from the summing node 250 is fed to a current stage amplifier 254 which generates an output that is fed back to the motor current calibration VI converter 244 and is also provided to the motor BEMF stage 234 for analog computation of motor BEMF. The currents at summing node 250 are connected in such a manner that calculation $I_{E1}=I_{11}-I_{12}$ is performed. The error current $I_{E1}$ is amplified by current stage amplifier 254 and fed back (negative feed-back loop with high gain) to the input of the calibration VI converter 254, and then $I_{12}$ is controlled to force $I_{E1}=0$, that is, force $I_{12}=I_{11}$. Since these two VI converters' input/output transfer functions are similar, above current computation is equivalent to making voltage input of VI 244 a copy of voltage input of VI 240.

A first VI converter, motor voltage input VI converter 260 in the motor BEMF stage 234, receives a motor sensor voltage from the voltage sensor 220 and the reference voltage VREF to generate an output current $I_{21}$ related to the motor's voltage. A second VI converter, current stage input VI converter 280, receives the output of current stage 230 and the reference voltage VREF to generate an output current $I_{22}$ related to the motor's current. A third VI converter, motor voltage calibration VI converter 264, receives the output of BEMF amplifier 274 and the reference VREF to generate a calibration output current $I_{23}$. The output current $I_{21}$ and $I_{22}$ of VI converter 260 and 280, and the calibration output current $I_{23}$ from VI converter 264 are combined at summing node 270 to form an estimate of the motor's BEMF voltage. The currents at summing node 270 are connected in such a manner that calculation $I_{E2}=I_{21}-I_{22}-I_{23}$ is performed. The error current $I_{E2}$ is amplified by BEMF amplifier 274 and fed back (negative feed-back loop with high gain) to the input of the calibration VI converter 264, and then $I_{23}$ is controlled to force $I_{E2}=0$, that is, force $I_{23}=I_{21}-I_{22}$. Since the three VI converters' transfer function are nominally identical, above current computation is equivalent to a voltage domain computation (voltage input to VI 264)=(voltage input to VI converter 280)−(voltage input to VI converter 260), which performs the required subtraction computation between the motor voltage and current described previously. As a result, output from BEMF amplifier 274 which generates a BEMF voltage output that can be employed by a controller to control the motor 210.

Figure 7:
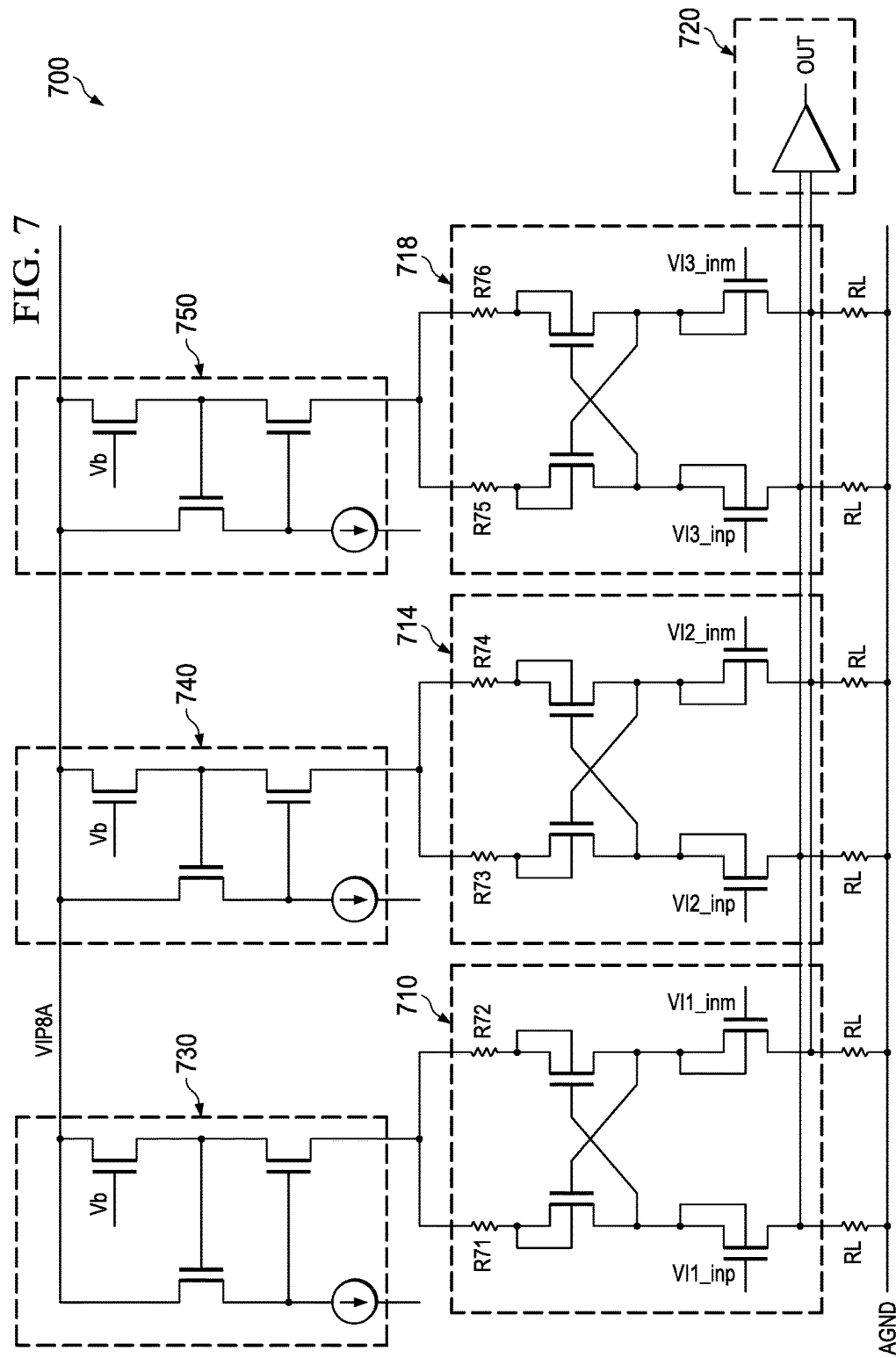
FIG. 7 illustrates an example of a six input operational amplifier that can be employed in a BEMF monitor circuit.

In order to determine BEMF, output from the resistance sense stage 230 can be combined with the voltage determinations in the motor BEMF stage 234 to compute the motor's BEMF. In this example, the current stage output is processed in the motor BEMF stage 234 via an additional VI converter 280 whose output is summed along with currents representing motor voltage and calibration at 270. Thus, in this example, the motor BEMF 234 can be configured as a 6 input operational amplifier having a single output for BEMF in this example. An example of this configuration using multiple differential amplifiers driving a single operational amplifier is shown in FIG. 7.

Figure 3:
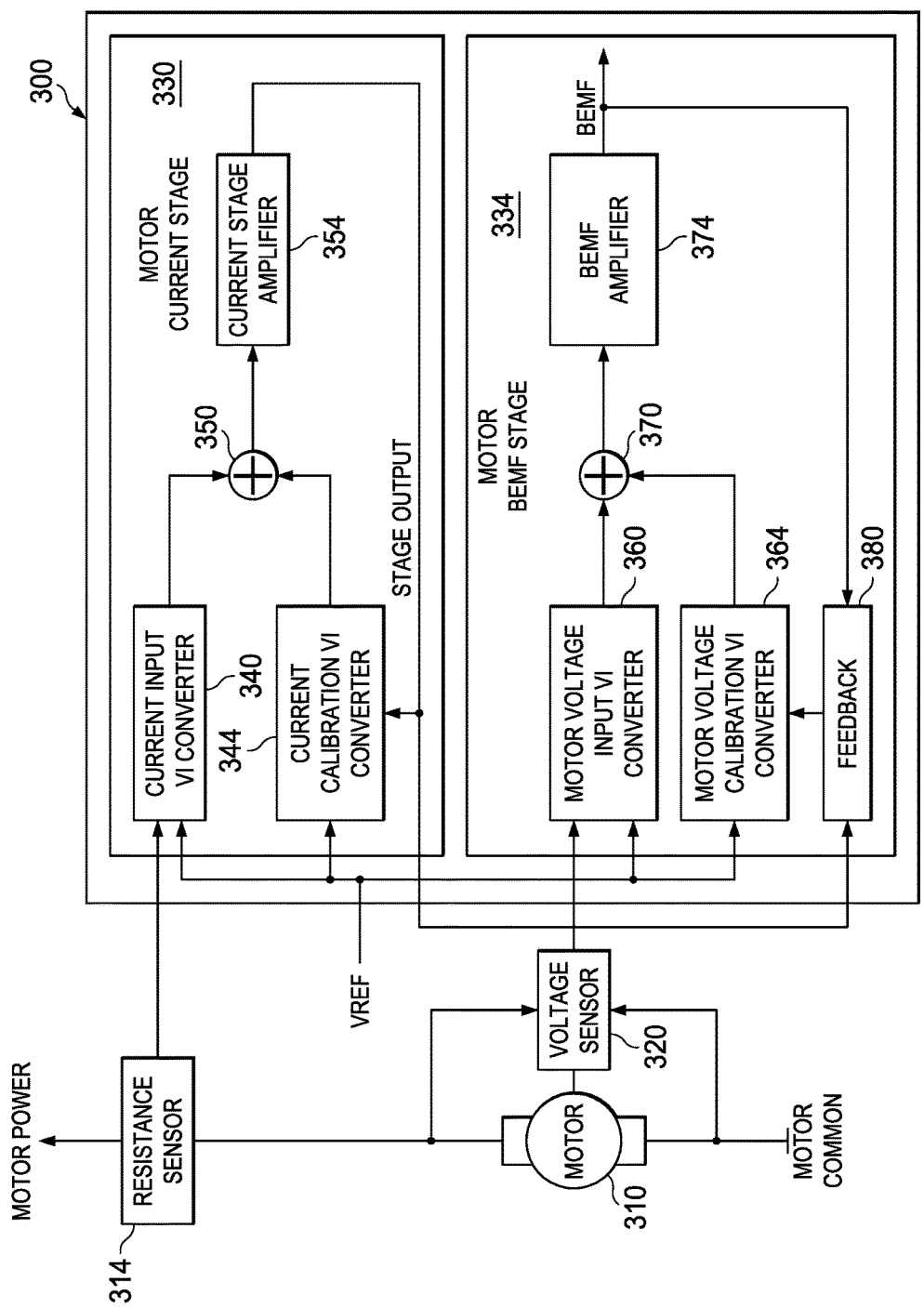
FIG. 3 illustrates an example of an integrated circuit that includes back electromotive force (BEMF) monitor further implementing feedback to a motor calibration converter in a motor BEMF stage to compute motor BEMF.

FIG. 3 illustrates an example of an integrated circuit 300 for a back electromotive force (BEMF) monitor that employs feedback to a motor calibration amplifier in a motor BEMF stage 334 to compute motor BEMF. In this example, a motor 310 is energized via motor power and common connections which can be supplied from a controller (not shown). Current from the motor 310 is sensed via current sensor 314 and voltage from the motor is sensed via voltage sensor 320. The current sensor 314 and/or voltage sensor 320 can be provided by resistive networks, for example. The current sensor 314 generates a voltage proportional to the motor current where a motor current stage 330 determines a value for the motor's current. Output from the motor current stage 330 is fed to the motor BEMF stage 334, which is configured to determine motor voltage via the voltage sensor 320. Additionally, the motor BEMF stage 334 combines the current estimate from the motor current stage 330 with the motor voltage determination to compute a motor BEMF voltage, shown as BEMF, which can be sent to a controller to control the motor 310.

A motor current input voltage-to-current (VI) converter 340 in the motor current stage 330 receives a motor current sensor voltage from the current sensor 314 and a reference voltage VREF to generate an output current related (e.g., proportional) to the motor's current. A motor current calibration VI converter 344 is configured to compensate for errors (e.g., gain errors, CMRR) in the motor current input VI converter 340 and generates a calibration output current based on the reference voltage VREF and the feedback from the output of BEMF amplifier 354. The output current and the calibration output current of converters 340 and 344 are combined at a summing node 350 to form an estimate of the motor's current. Output from the summing node 350 is fed to a current stage amplifier 354 which generates an output that is fed back to the motor current calibration VI converter 344 and is also provided to the motor BEMF stage 334 for analog computation of motor BEMF.

A motor voltage input VI converter 360 in the motor BEMF stage 334 receives a motor sensor voltage from the voltage sensor 320 and the reference voltage VREF to generate an output current related to the motor's voltage. A motor voltage calibration VI converter 364 is configured to compensate for errors (e.g., gain errors, CMRR) in the motor voltage input VI converter 360 and generates a calibration output current based on the reference voltage VREF and the middle tap point of feedback resistor 380. The feedback resistor 380 is tied to the output of current stage amplifier 354 on one end and tied to the output of BEMF amplifier 374 on the other end. The output current and the calibration output current from VI converters 360 and 364 are combined at summing node 370 to form an estimate of the motor's BEMF voltage. Output from the summing node 370 is fed to BEMF amplifier 374 which generates a BEMF voltage output that can be employed by a controller to control the motor 310.

Figure 6:
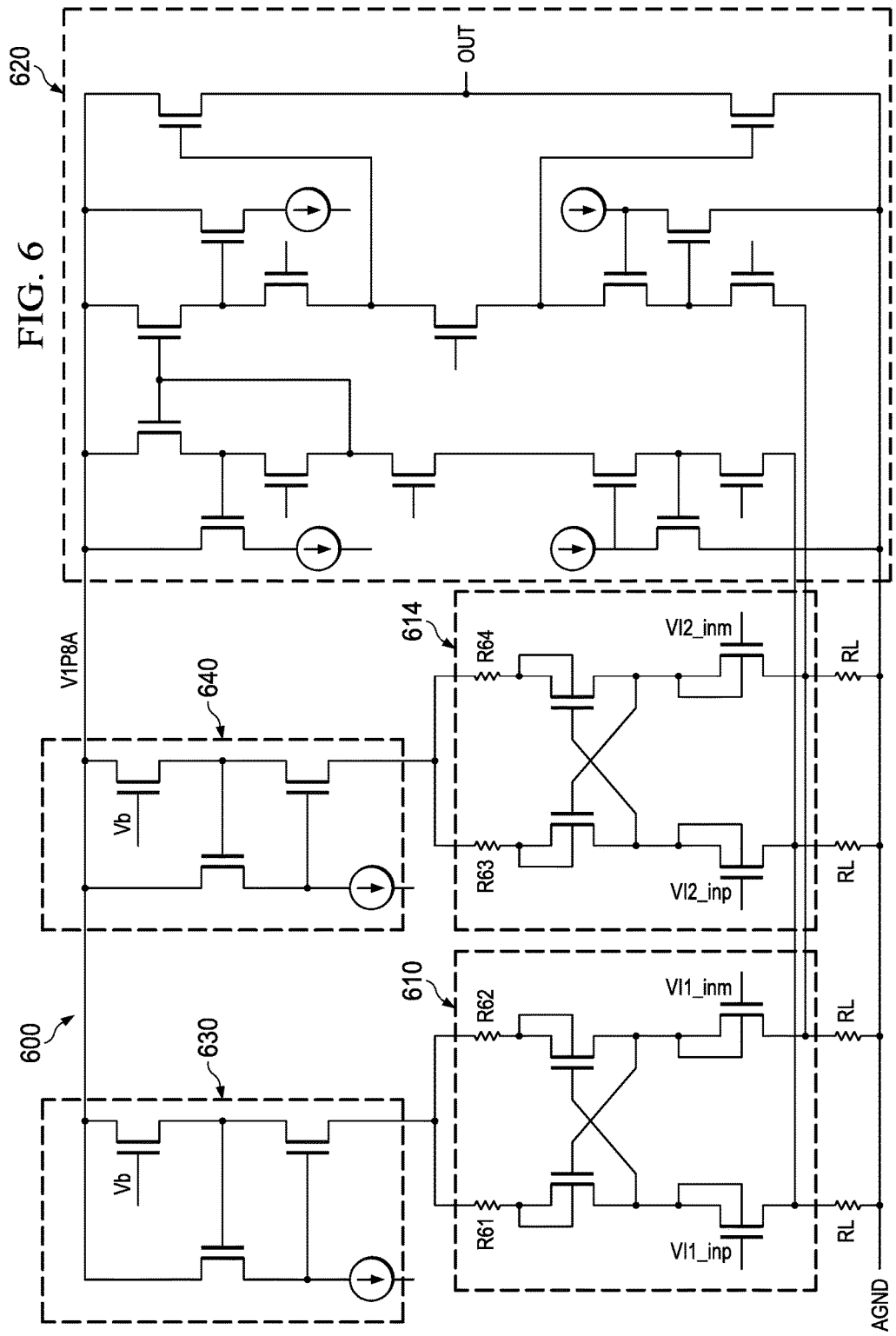
FIG. 6 illustrates still another example of a four input operational amplifier that can be employed in a BEMF monitor circuit.

In order to determine BEMF, output from the motor current stage 330 can be combined with the voltage determinations in the motor BEMF stage 334 to compute the motor's BEMF. In this example, the current stage output is utilized by the motor voltage calibration VI converter 364 as feedback 380 (e.g., feedback resistor) which can be combined with the BEMF feedback from the BEMF amplifier 374. Thus, a four input operational amplifier such as shown in FIG. 6 can be employed for the motor BEMF stage 334. Similarly, the four input operational amplifier depicted in FIG. 6 can also be employed for the motor current stage.

Figure 4:
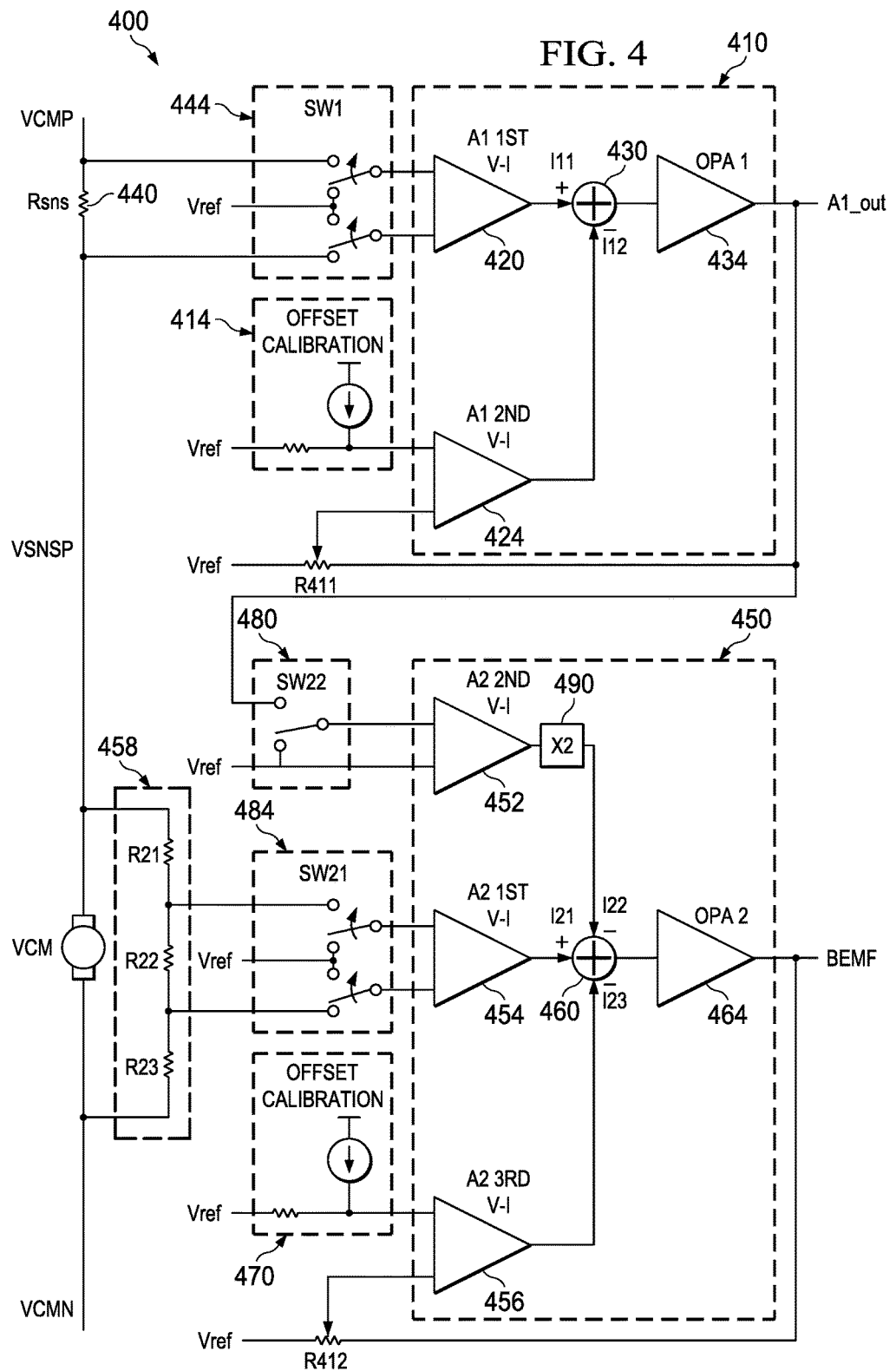
FIG. 4 illustrates a circuit example of a back electromotive force (BEMF) monitor that employs an additional VI converter in a motor BEMF stage to compute motor BEMF.

FIG. 4 illustrates an example of a back electromotive force (BEMF) monitor circuitry 400 that employs an additional VI converter in a motor BEMF stage 450 to compute motor BEMF. In this example, a motor current stage 410 receives four inputs, including two inputs from a current sensor 440 and two related to reference VREF. The motor current stage 410 includes two VI converters 420 and 424 that are coupled to provide respective current outputs to a summing node 430, which drives an amplifier 434. The first VI converter 420 converts the voltage across a sense resistor 440 to a first output current $I_{11}$. The second VI converter 424 converts the difference between circuit reference e.g., VREF=0.9V and a tap-point of a feedback resistor path R411 into a second output current $I_{12}$. The first VI output current $I_{11}$ and the second VI output current $I_{12}$ are subtracted at summing node 430, where the resulting difference is amplified by the amplifier 434 to provide a compensated indication of motor current. A feedback loop from amplifier 434 forces the input of the second VI converter 424 to be a copy of the first VI converter 420 input. Meanwhile, the voltage input of second VI converter 424, which is a copy of the first VI converter 420, is gained up by digitally programmable gain (e.g. 12-bit resistor DAC) set up by potential-meter R411. It is this gain that is digitally calibrated to be a ratio of motor resistor and sense resistor i.e. $G=R_M/R_{NS}$, which was described previously.

An aspect regarding why two VI converters are employed, is that the first VI converter 420 receives a high voltage common mode (e.g., 12V) signal from motor current sensor 440. The switches processing the high voltage (HV) signal should be constructed to withstand high voltage for circuit safety considerations and they are considerably area consuming. Therefore, a minimum of two HV switches 444 are used to alter the circuit between normal operation mode (when VI 420 input is switched to sensor 440) and offset calibration mode (when VI 420 input is switched to Vref). In contrast, the input of second VI converter 424, which is a copy of voltage input of first VI converter 420, can be in low-voltage (LV) domain (0.9+/−0.7V, i.e. from 0.2V to 1.6V), thus a large number of low voltage switches (not shown) can be employed for a 12 bit programmable gain DAC as illustrated as potentiometer R411, to avoid consuming large silicon area. In implementation, the two VI converters 420 and 424 are substantially identical in both schematic and layout, and they can be laid out next to each other in silicon such that the mismatching between the two converters is minimized.

In this example, a second stage 450 is configured to determine BEMF, and includes three VI converters 452, 454, and 456. The VI converter 454 receives an attenuated version (e.g., divided by 6) of motor voltage via resistive divider network 458 and converts the detected voltage into a current shown as I21. The VI converter 452 receives output from stage 410 and converts it into I22. In one example, current from the VI converter 452 is multiplied by a gain factor (e.g., a factor of two) to provide I22. The VI converter 456 determines a voltage difference between circuit reference VREF and a feedback tap point of R412 to provide a compensation current I23. The output currents of three VI converters 452, 454, and 456 are combined at 460 to produce an error current ($I_E$) to an input of an output amplifier 464 (e.g., $I_E$=I21−I22−I23). The error current $I_E$ is amplified by amplifier 464 and generates BEMF output, which can also fed back to VI converter 456 via digitally programmable potentiometer R412. The feed-back loop forces the input of the VI converter 456 to be a copy of difference of the input of VI converter 452 and the input of VI converter 454, that is, $V_1-V_2=V_{VCM}/6-2\times V_{A1\_out}$ and meanwhile it is amplified by a programmable amplifier gain stage via potentiometer R412. An offset calibration DAC 470 (e.g., 6 bit DAC) can be used to cancel offset of whole BEMF stage 450 when both switches 480 and 484 are connected to VREF. Switch 480 can be periodically switched to provide samples of VREF (when stage 450 is configured in offset calibration mode) and the output from stage 410 to VI converter 452 (when stage 450 is configured as normal BEMF monitor mode). Switch 484 can be periodically switched to provide samples of VREF (when stage 450 is configured in offset calibration mode) and the output from network 458 to the VI converter 454 (when stage 450 is configured as normal BEMF monitor mode).

The resistors in the network 458 for signal attenuation do not have to be matched in high precision because any introduced gain error can be compensated by programmable gain for stage 410. Also, since the substantially infinite input impedance of the stage 410 and the input stage 450 (e.g., VI converters), the low on-state resistance requirement on switches 444, 480, and 484 can be largely relieved. Therefore, the front node switch size can be reduced.

Figure 5:
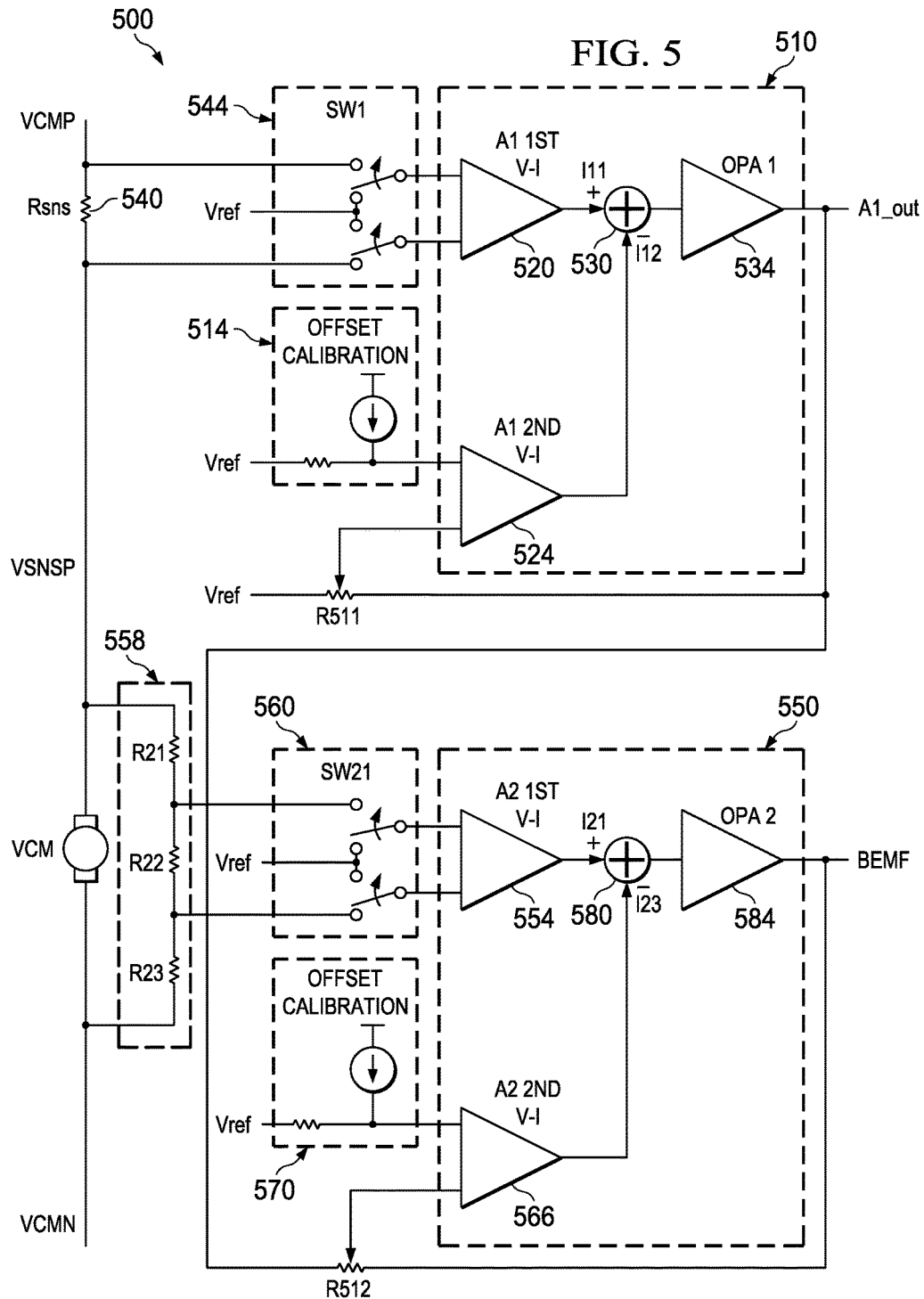
FIG. 5 illustrates a circuit example of a back electromotive force (BEMF) monitor that employs feedback to a motor calibration converter in a motor BEMF stage to compute motor BEMF.

FIG. 5 illustrates a circuit example of a back electromotive force (BEMF) monitor 500 that employs feedback to a motor calibration amplifier in a motor BEMF stage to compute motor BEMF. A motor current stage includes a 4-input amplifier 510, a digitally programmable gain potentiometer R511 and an offset calibration DAC 514 (e.g., 10 bit DAC). The amplifier 510 includes two VI converters 520 and 524 which are coupled to form a summing node 530 which drives an amplifier 534. The first VI converter 520 converts the voltage across a voice coil motor (VCM) sense resistor 540 to a current $I_{11}$. The second VI converter 524 converts the voltage difference between circuit reference (e.g., VREF=0.9V) and a tap-point of a feedback resistor R511 into a current $I_{12}$. The first VI output current ($I_{11}$) and the second VI output current ($I_{12}$) are subtracted at summing node 530, where the resulting difference is amplified by the amplifier 534. Because of very high loop gain, the feedback loop (formed by amplifier 534 and potentiometer R511) forces the voltage input of the second VI converter 524 to be a copy of the first VI converter 520 input. Meanwhile, the input of VI 524, which is a copy of the input of VI 520, is amplified by programmable gain set by R511 to provide a corresponding amplified output. The amplified output from amplifier 520 is fed to VI converter 524 for gain cancelation. In implementation, the two VI converters 520 and 524 are nominally identical in both schematic and layout, and they can be laid out next to each other in silicon to mitigate mismatching between the two converters. As shown, a controllable switch 544 can switch between VREF (when stage 510 is configured as offset calibration mode) and the voltage across the sense resistor 540 (when stage 510 is configured as normal BEMF monitor mode).

In this example, the BEMF stage of FIG. 5 is implemented via two VI converters 554 and 566. In the BEMF monitor, described above and shown in FIG. 4, BEMF stage has three VI converters whose output current are connected as $I_{21}$–$I_{22}$–$I_{23}$. The subtraction operation between three elements implies that all of the three VI converters are required to have suitable linearity. However, in a dual VI converter BEMF stage 550, the VI linearity requirement can be substantially relieved and the matching of the two VI converters takes precedence over VI linearity. As shown in FIG. 5, instead of driving an additional VI converter to receive output from the stage 510, output from stage 510 is fed to drive one side of gain resistor R512. A BEMF stage 550 includes a first VI converter 554 that receives a motor voltage via resistor network 558 and switch 560. A second VI converter 566 receives a calibration input from offset calibration DAC 570 (e.g., 6 bit DAC) and output from current stage 510. Output from VI converters 554 and 566 are combined at summing node 580, which is then amplified via amplifier 584 to produce motor BEMF at its output. Output from amplifier 584 is fed back to the other side of R512 for stage gain control.

FIG. 6 illustrates an example of a four input operational amplifier 600 that can be employed in a BEMF monitor circuit. The amplifier 600 could be employed as the motor current stage 230 and 330 depicted if FIGS. 2 and 3 respectively. The amplifier 600 includes two VI converters 610 and 614. The VI converters can be cross-coupled differential amplifiers and can be implemented as NMOS transistors and/or PMOS transistors. In this example, each VI converter 610 and 614 includes two pairs of PMOS devices that are cross coupled and stacked such that the VI conversion nonlinearity due to CMOS square law is cancelled out and VI trans-conductance is degenerated by R (shown as R61 through R64) The current output of these two VI converters 610 and 614 are subtracted before being loaded by $R_L$ and fed into an operational amplifier 620. The common mode rejection ratio (CMRR) of a VI converter can be written as:

$$CMRR = \frac{\Delta g_m R_L}{(g_{m1} + g_{m2})R_{SS}}$$

where $g_{m1}$, $g_{m2}$ are respectively the trans-conductance of both input branches of the VI converter, $\Delta g_m$ is the difference between the input pair trans-conductance due to any mismatching between two input branches, $R_{SS}$ is the tail current impedance, and $R_L$ is VI converter resistive load.

The CMRR can be largely attenuated by increasing the tail current impedance $R_{SS}$. To further achieve high CMRR, the tail current mirror impedance can be enhanced with very low cost gain boost stage such as shown at boost stage 630 and boost stage 640. As shown, outputs from the VI converters 610 and 614 can be coupled to form a summing node at the input of the amplifier 620.

FIG. 7 illustrates an example of a six input operational amplifier 700 that can be employed in a BEMF monitor circuit. The amplifier 700 could be employed as the BEMF stage 234 depicted in FIG. 2 and the BEMF stage 450 depicted in FIG. 4. In this example, three VI converters 710, 714, and 718 can be configured to provide 6 inputs that drive an operational amplifier output stage 720. Gain boost stages 730, 740, and 750 can be provided to increase the tail current impedance of each VI converter and thus enhance CMRR for each converter. Output from each VI converter can be coupled to form a summing node at the input to the amplifier 720.

What have been described above are examples. It is, of course, not possible to describe every conceivable combination of components or methodologies, but one of ordinary skill in the art will recognize that many further combinations and permutations are possible. Accordingly, the disclosure is intended to embrace all such alterations, modifications, and variations that fall within the scope of this application, including the appended claims. As used herein, the term "includes" means includes but not limited to, the term "including" means including but not limited to. The term "based on" means based at least in part on. Additionally, where the disclosure or claims recite "a," "an," "a first," or "another" element, or the equivalent thereof, it should be interpreted to include one or more than one such element, neither requiring nor excluding two or more such elements.

What is claimed is:

1. An integrated circuit comprising:
    a motor current input voltage-to-current (VI) converter configured to:
        generate an output current based on a motor current sensor voltage and based on a reference voltage;
    a motor current calibration VI converter configured to generate a calibration output current based on the reference voltage; and
    a summing node configured to combine the output current and the calibration output current, to generate a corrected indication of motor current.

2. The integrated circuit of claim 1, further comprising a current stage amplifier configured to amplify the corrected indication of the motor current, to generate the stage output, wherein the stage output is fed back to the motor current calibration VI converter and the stage output is fed to a back electromotive force (BEMF) stage, the BEMF stage being configured to compute a BEMF voltage for a motor.

3. The integrated circuit of claim 2, the BEMF stage further comprising a current stage amplifier configure to amplify the corrected indication of motor current, to generate stage output, wherein the stage output is fed back to the motor current calibration VI convertor and the stage output is fed to a back electromotive force (BEMF) stage, the BEMF stage being configured to compute a BEMF voltage for the motor.

4. The integrated circuit of claim 3, wherein the motor voltage input VI converter and the motor voltage calibration VI converter are configured to receive the reference voltage to generate respective current outputs.

5. The integrated circuit of claim 3, wherein the motor current calibration VI converter, the motor current input VI converter, the motor voltage input VI converter, and the motor voltage calibration VI converter are cross-coupled differential amplifiers.

6. The integrated circuit of claim 5, wherein the cross-coupled differential amplifiers comprise boost amplifier stages.

7. The integrated circuit of claim 5, wherein the cross-coupled differential amplifiers are cross-coupled negative metal oxide semiconductor (NMOS) transistors or cross-coupled positive metal oxide semiconductor (PMOS) transistors.

8. The integrated circuit of claim 3, wherein the BEMF stage further comprises:
a current stage input VI converter configured to generate an output current $I_{22}$ based on the stage output and based on the reference voltage; and
wherein the second summing node is further configured to combine the output current $I_{22}$ with the second output current and the second calibration output current, to generate the BEMF voltage estimate for the motor.

9. The integrated circuit of claim 3, wherein the BEMF stage further comprises:
a BEMF amplifier coupled to the second summing node, the BEMF amplifier configured to generate a BEMF output voltage; and
a feedback resister configured to generate BEMF feedback based on the BEMF output voltage and based on the stage output; and
wherein the motor voltage calibration VI converter is configured to further generate the second calibration output current based on the BEMF feedback.

10. The integrated circuit of claim 3, further comprising:
a BEMF amplifier configured to generate a BEMF output based on the BEMF voltage estimate for the motor and to feed back the BEMF output to the motor voltage calibration VI converter.

11. The integrated circuit of claim 1, wherein the motor current input voltage-to-current (VI) converter is further configured to receive, from a current sensor, the motor current sensor voltage based on a motor current of a motor.

12. An integrated circuit comprising:
a motor voltage input voltage-to-current (VI) converter configured to:
generate an output current based on a sensed voltage and based on a reference voltage;
a motor voltage calibration VI converter configured to generate a calibration output current based on the reference voltage; and
a summing node configured to combine the calibration output current and the output current, to generate a BEMF voltage estimate for a motor.

13. The integrated circuit of claim 11, further comprising a BEMF amplifier configured to generate a back electromotive force (BEMF) output voltage based on the BEMF voltage estimate for the motor and to feed back the BEMF output voltage to the motor voltage calibration VI converter.

14. The integrated circuit of claim 13, further comprising:
a motor current input voltage-to-current (VI) converter configured to receive a motor current sensor voltage from the motor and to receive the reference voltage and to generate a second output current based on the motor current sensor voltage and based on the reference voltage;
a motor current calibration VI converter configured to generate a second calibration output current based on the reference voltage; and
a second summer configured to combine the second output current and the second calibration output current, to generate a corrected indication of motor current.

15. The integrated circuit of claim 14, further comprising a current stage amplifier configured to amplify the corrected indication of motor current, to generate a stage output, and to feed back the stage output to a current calibration VI converter.

16. The integrated circuit of claim 15, wherein the motor voltage calibration VI converter utilizes the stage output to generate the calibration output.

17. The integrated circuit of claim 12, wherein the motor voltage input voltage-to-current (VI) converter is further configured to receive, from a voltage sensor, the sensed voltage corresponding to a voltage across the motor.

18. An integrated circuit comprising:
a motor current input voltage-to-current (VI) converter configured to generate a first output current based on a motor current sensor voltage and based on a reference voltage;
a motor current calibration VI converter configured to generate a first calibration output current based on the reference voltage;
a first summing node configured to combine the first output current and the first calibration output current, to generate a corrected indication of motor current;
a motor voltage input VI converter configured to generate a second output current based on a motor voltage sensor voltage;
a motor voltage calibration VI converter configured generate a second calibration output current based on the reference voltage, wherein the motor voltage calibration VI converter is different than the motor current calibration VI converter; and
a second summing node configured to combine the second output current and the second calibration output current to generate a BEMF voltage estimate for a motor.

19. The integrated circuit of claim 18, wherein the motor current input VI converter, the motor current calibration VI converter, the motor voltage calibration VI converter, and the motor voltage calibration VI converter are cross-coupled differential amplifiers.

20. The integrated circuit of claim 18, wherein the motor current input voltage-to-current (VI) converter is further configured to receive the motor current sensor voltage from the motor and to receive the reference voltage, and wherein the motor voltage input VI converter is further configured to receive the motor voltage sensor voltage from the motor and to receive the reference voltage.

* * * * *